United States Patent [19]

Roempp

[11] Patent Number: 4,887,261
[45] Date of Patent: Dec. 12, 1989

[54] METHOD AND ARRANGEMENT FOR TRANSMITTING A DIGITAL SIGNAL WITH A LOW BIT RATE IN A TIME SECTION, PROVIDED FOR HIGHER BIT RATES, OF A TIME DIVISION MULTIPLEXED SIGNAL

[75] Inventor: Claus Roempp, Munich, Fed. Rep. of Germany

[73] Assignee: Siemens Aktiengesellschaft, Berlin and Munich, Fed. Rep. of Germany

[21] Appl. No.: 128,158

[22] Filed: Dec. 3, 1987

[30] Foreign Application Priority Data

Dec. 19, 1986 [DE] Fed. Rep. of Germany ....... 3643561

[51] Int. Cl.$^4$ .............................................. H04J 3/22
[52] U.S. Cl. ........................................ 370/84; 375/26
[58] Field of Search ................. 370/84, 102, 111, 109; 375/26; 328/151; 340/347 SH

[56] References Cited

U.S. PATENT DOCUMENTS

| 3,458,309 | 12/1970 | Saltzbert et al. | 430/13 |
| 4,053,708 | 10/1977 | Hotchkiss | 178/69.1 |
| 4,230,911 | 10/1980 | Fellinger et al. | 370/84 |
| 4,578,797 | 3/1986 | Satoh et al. | 370/84 |

FOREIGN PATENT DOCUMENTS 1462579 2/1969 Fed. Rep. of Germany.
2521731 10/1976 Fed. Rep. of Germany.

OTHER PUBLICATIONS

"Multiplex Equipment DSMX 64K/2 & Insertion Unit DSE 64K/2 for Digital Transmission" by Graf et al., telecom report 2, (1979), special issue, Digital Transmission.
"Dataport-Channel Units for Digital Data System Substrates", by Aprille, et al., Bell System Technical Journal, vol. 61 (1982), Nov., No. 9, Part 3, pp. 2721 through 2740.

Primary Examiner—Benedict V. Safourek
Assistant Examiner—Wellington Chin
Attorney, Agent, or Firm—Hill, Van Santen, Steadman & Simpson

[57] ABSTRACT

A method and arrangement for transmitting a digital signal with a low bit rate in a time section, provided for higher bit rates, of a time division multiplexed signal. At a transmitting end the first digital signal with a low bit rate is over-sampled with a first clock signal assigned to this time section. A second digital signal which results is transmitted in the time division multiplexed signal to a receiving end. Following the demultiplexing of the time division multiplexed signal, this second digital signal is sampled with a second clock signal, corresponding to its bit rate, omitting forbidden phase position zones, and results in a fifth digital signal. The forbidden phase position zones are defined by a shift register, an exclusive-NOR-gate, an upwards/downwards counter and a logic unit. Double samplings are prevented in that the phase of the second clock signal is shifted via the resetting of a frequency divider. The method in accordance with the invention permits for example, the occasional transmission of a digital signal with a lower bit rate in a digital signal multiplex device designed for the grouping of thirty-two 64 kbit/s-signals.

11 Claims, 4 Drawing Sheets $$DS1 = 4.8\,kHz \qquad T2max = \frac{1}{2(109,34-15,6)\mu s} = 5,3\,kHz$$

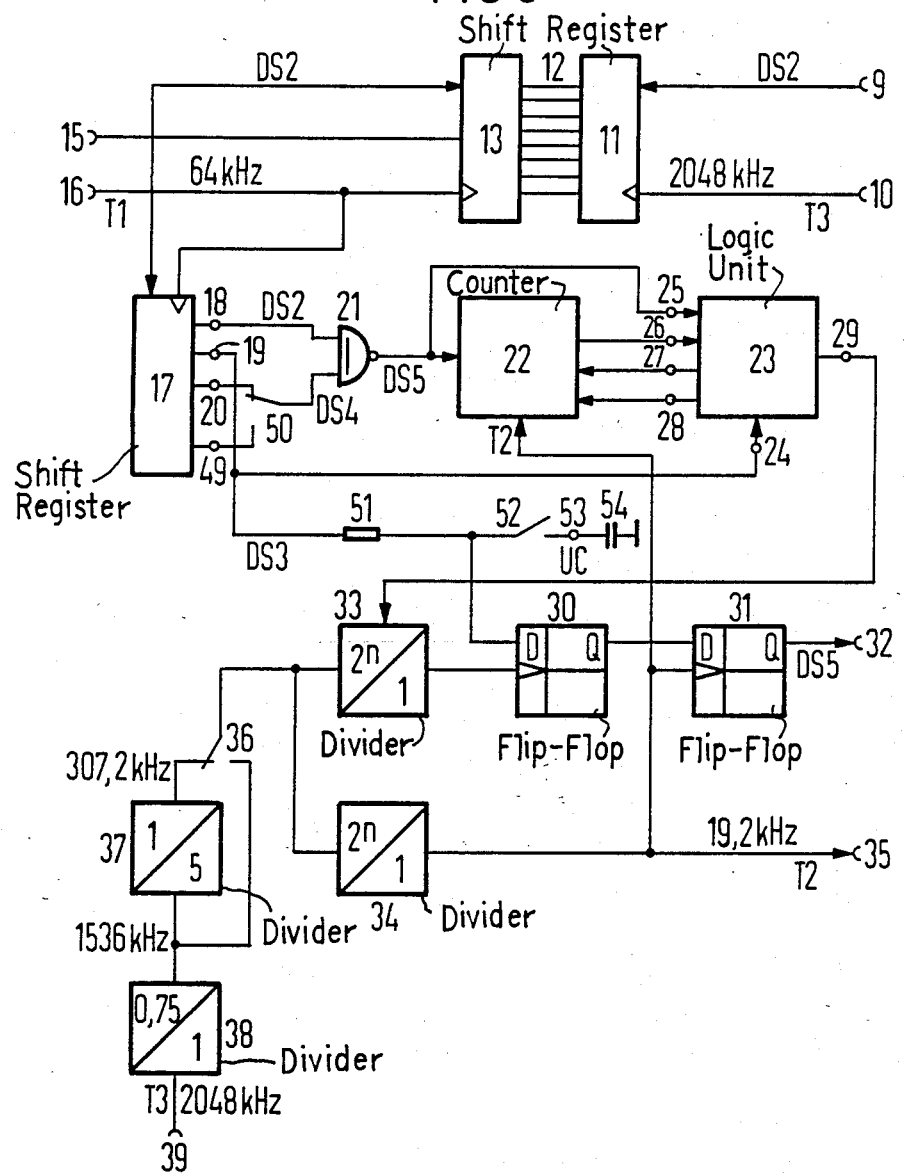

METHOD AND ARRANGEMENT FOR TRANSMITTING A DIGITAL SIGNAL WITH A LOW BIT RATE IN A TIME SECTION, PROVIDED FOR HIGHER BIT RATES, OF A TIME DIVISION MULTIPLEXED SIGNAL

BACKGROUND OF THE INVENTION

The invention relates to a method and an arrangement for transmitting a digital signal in a time section of a pulse frame of a time division multiplexed signal, for which a higher bit rate than that of the digital signal is made available for transmission in this time section.

The magazine "Telecom Report" 2, (1979), special issue "Digital Transmission", pages 46–51 discloses a digital signal primary multiplex device in which 32 synchronous 64-kbit/s-signals can be combined to form a 2048-kbit/s time division multiplexed signal.

SUMMARY OF THE INVENTION

An object of the invention is to provide a method and arrangement with which, instead of a 64-kbit/s-signal, a digital signal with a bit rate of between 0.6 and 19.2 kbit/s can also be transmitted without losses and with the least possible circuitry. No signal distortions are to occur during synchronous transmission.

Commencing from a method of the type described in the background, this object is achieved in accordance with the invention in that a first digital signal is over-sampled at the transmitting end with a first clock signal assigned to this time section, that a second digital signal obtained as a result of the over-sampling is transmitted in the time division multiplexed signal, and that at the receiving end, following demultiplexing, the second digital signal is sampled with a second clock signal, corresponding to its bit rate, omitting forbidden phase position zones which would otherwise result in double samplings.

Here it is advantageous if, in order to form a pulse train which blocks the forbidden phase position zones since they are overlapped with pulses, the second digital signal is delayed by one period of the first clock signal and is further processed as a third digital signal. The second digital signal is delayed by two periods of the first clock signal and is referred to as a fourth digital signal. The second and fourth digital signals are subjected to exclusive-OR-logic-linking.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 6 is a block diagram depicting a second receiving-end arrangement for the implementation of the method corresponding to the invention.

DESCRIPTION OF THE PREFERRED EMBODIMENT

Figure 1:
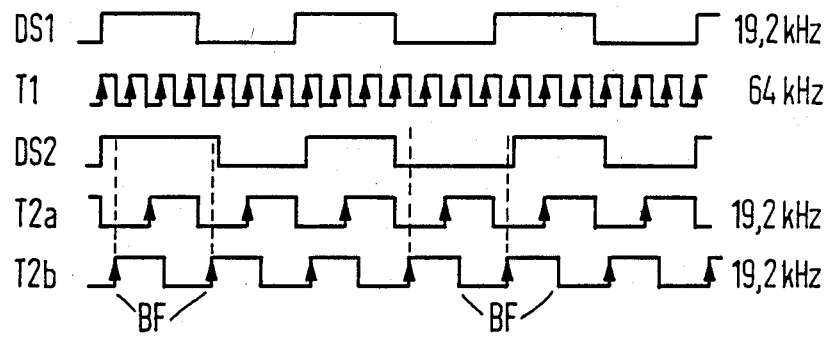
FIG. 1 is a diagram illustrating the sampling of the first and second digital signals.

FIG. 1 illustrates a digital signal DS1 with a bit rate of 19.2 kbit/s. This digital signal is sampled by a clock signal T1 with a frequency of 64 kHz, resulting in a digital signal DS2 which is transmitted. At a receiving end this digital signal is sampled by a clock signal T2 with a frequency of 19.2 kHz, where the arrows indicate the leading pulse edges. Two phase positions of the clock signal T2 have been referenced T2a and T2b. A satisfactory sampling of the digital signal DS2 can be effected with the clock signal T2a. In the case of sampling by the clock signal T2b, bit errors BF may occur as a result of double sampling.

Figure 2:
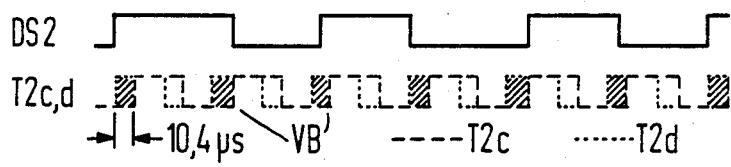
FIG. 2 is a diagram illustrating the forbidden phase positions.

FIG. 2 illustrates the digital signal DS2 and two phase positions T2c and T2d of the clock T2 which bracket the shaded phase position zone in which double samplings are possible. These zones are referred to as forbidden phase position zones VB.

Figure 3:
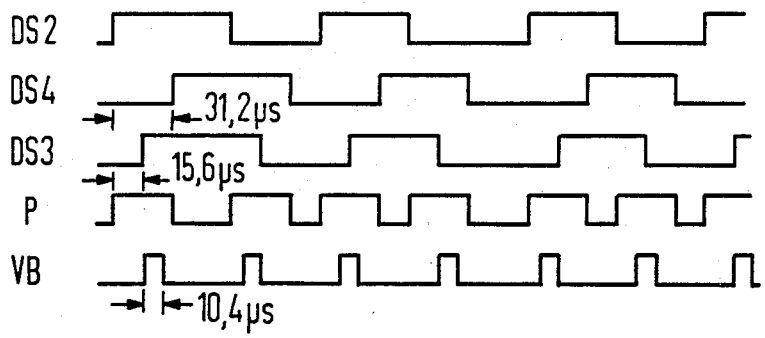
FIG. 3 is a diagram illustrating the formation of pulses which overlap the forbidden phase positions.

FIG. 3 represents a method for obtaining a pulse train P, the pulses of which cover the forbidden phase position zones VB. For this purpose the digital signal is delayed by one period of the clock signal T1 in order to form a digital signal DS3, and also is delayed by two periods of the clock signal T1 in order to form a digital signal DS4. The pulse train P is derived from the digital signals DS2 and DS4 by an exclusive-OR-logic-link. The digital signal DS3 is further processed in place of the digital signal DS2. The forbidden phase position zones VB are shown at the bottom of FIG. 3.

Figure 4:
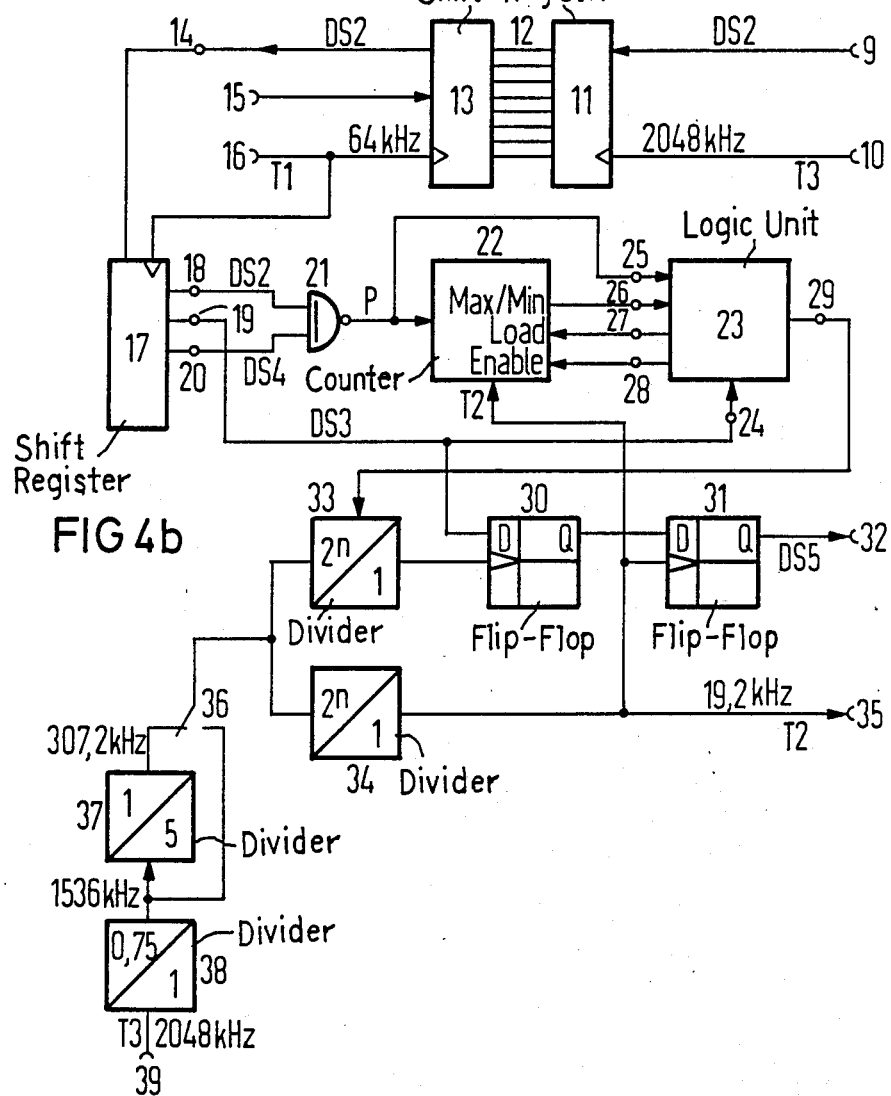
FIG. 4a is a general block diagram depicting a transmitting-end arrangement for the implementation of the method in accordance with the invention.
FIG. 4b is a block diagram depicting a first receiving end arrangement for the implementation of the method corresponding to the invention.

FIG. 4a represents a transmitting-end arrangement for the implementation of the method corresponding to the invention. The arrangement has a shift register 3 for series-parallel conversion, a shift register 5 for parallel-series conversion, and a group of lines 4 which connects the two shift registers 3 and 5.

If a digital signal DS1 with a bit rate of 19.2 kbit/s is applied to the input 1, this digital signal is series-parallel converted with the clock signal T1, which has a frequency of 64 kHz, at the input 2. The signal is then supplied to the shift register 5 where it is read with the clock signal T3, which has a frequency of 2048 kHz, at the input 8 when a channel select signal occurs at the input 7 for one of the 32 channels of the 2048-kbit/s time division multiplexed signal in which data transmission is possible. The digital signal DS2 is transmitted via the output 6.

FIG. 4b illustrates a receiving-end arrangement for the implementation of the method corresponding to the invention. This arrangement has shift registers 11, 13 and 17, an exclusive-NOR-gate 21, an upwards/downwards counter 22, a logic unit 23, D-flip-flops 30 and 31, frequency dividers 33, 34, 37 and 38 and a change-over switch 36.

Figure 5:
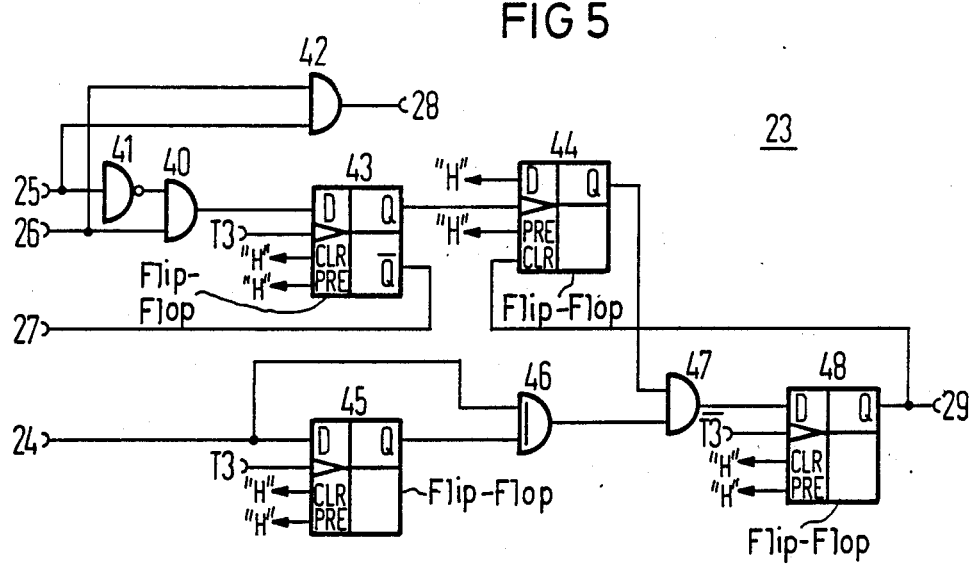
FIG. 5 is a circuit diagram of a logic unit of the arrangement shown in FIG. 4b.

FIG. 5 is a detailed view of the logic unit 23 which has AND-gates 40, 42 and 47, an inverter 41, D-flip-flops 43, 44, 45 and 48 and an exclusive-OR-gate 46.

A received digital signal DS2, which has been separated in a demultiplexer, is fed in FIG. 4b via the input 9 to the shift register 11 where it is series-parallel converted with the clock signal T3 at the input 10, and is input into the shift register 13 via the group of connection lines 12. From this shift register 13, when a channel select signal is provided at the input 15, it is read via the output 14 by the clock signal T1 at the input 16, and is input into the shift register 17, again by means of the clock signal T1. In the shift register 17 the delays described with reference to FIG. 3 are carried out. At the output of the exclusive-NOR-gate 21, the pulse train P appears which, in its pulse pauses, has the effect of a window for the clock signal T2. The latter feeds the digital signal DS3 through the D-flip-flops 30 and 31 as digital signal DS5 to the output 32 for such time as the logic-unit 23 does not emit an erasing signal via its output 29 to the frequency divider 33 and thus bring about a change in the phase position.

The clock signal T2 is produced from the clock signal T3, which has a frequency of 2048 kHz, and is provided at the input 39. This frequency T3 is first divided in the frequency divider 38 to a frequency of 1536 kHz and then, depending upon the position of the change-over switch 36, is fed directly, or following a further division in the frequency divider 37 to a frequency of 307.2 kHz, to the inputs of the frequency dividers 33 and 34, the division ratio of which is $2^n:1$. This clock device can produce frequencies of 0.75 kHz, 1.5 kHz, 3 kHz, 6 kHz, 0.6 kHz, 1.2 kHz, 2.4 kHz, 4.8 kHz, 9.6 kHz, 12 kHz and 19.2 kHz. In the exemplary embodiment the last frequency has been selected.

As bit errors BF can occur during the transmission of the digital signal DS2 it is not advisable to immediately resynchronize the interrogation time whenever the sampling time falls in a forbidden phase position zone, in particular as this zone is changed by the bit errors BF. Therefore the upwards/downwards counter 22 has been provided which is clock-controlled by the pulse leading edge of the sampling time. Its counting direction is dependent upon the window formed by the pulse train P around the da&:a pulse edges. If the pulse train P is at the logic state "L" (low level), also referred to as negative events, as is possible in the case of double sampling, counting takes place in the upwards direction. If the pulse train P has the logic state "H" (high level) in which no errors are possible, also referred to as positive events, counting takes place in the downwards direction. If only positive events, in the case of which no doubling sampling is possible, are counted, at the count of "0" the max/min output, and thus the input 26, of the AND-gate 40 (see FIG. 5) of the logic unit 23 is in a logic "H" state. Further downwards counting of the upwards/downwards counter 22 is prevented via the logic unit 23, so that the counter remains at the count of "0" until upwards counting recommences.

If several negative events occur in succession, in the case of which double sampling is possible, the upwards/downwards counter 22 counts upwards until a count of "9" is reached. At this value the max/min output, and thus the inputs 26, is in a logic "H" state. Now the sampling frequency is resynchronized and a starting count is loaded into the upwards/downwards counter 22.

The logic unit 23, which is shown in detail in FIG. 5, operates as follows: The pulse train P, which forms the window, occurs at an input 25 of an inverter 41. The inverted pulse train $\bar{P}$ occurs at an output of the inverter 41, and at an input of the AND-gate 40. A pulse occurs at the input of the AND-gate 40 both at the count "0" and at the count "9" of the upwards/downwards counter 22. If, in the case of negative events, a logic state "H" occurs at both inputs, the same state occurs at the output of the AND-gate 40. By way of contrast, the output 28 of the AND-gate 42, which is connected to the clock-enable input of the upwards/downwards counter 22, is in a logic state "H" when the logic state at the input 25 and at the input 26 is "H". This is the case when, as a result of the pulse train P, errors are impossible and the count of the upwards/downwards counter 22 is "0". In contrast, in the case of negative events, the output 28 assumes a logic state "L".

If a logic state "H" occurs at the D-input of the D-flip-flop 43, with the clock signal T3 the Q-output likewise is in the logic state "H" and the $\bar{Q}$-output is in a logic state "L" on the output 27 and via the output 27 to the load-input of the upwards/downwards counter 22. The logic state "H" at the Q-output triggers the D-flip-flop 44 so that its Q-output likewise assumes the logic state "H".

The digital signal DS3 occurring at the input 24 is differentiated by the D-flip-flop 45 and the exclusive-OR-gate 46. The D-flip-flop delays the digital signal DS3 with the clock signal T3. If a logic state "H" occurs at the two inputs of the AND-gate 47 as occurs in the event of an overflow of the upwards/downwards counter 22, this state is switched through to the output 29 via the D-flip-flop 48 which is synchronized to the inverted clock signal T3. At the output 29 of this state serves to reset the D-flip-flop 44 and the frequency divider 33.

For the resynchronization of the clock signal T2 which has a frequency of 19.2 kHz, the frequency divider 33 is erased with an arbitrary data pulse edge. The erasing process is followed by a pulse pause of the clock signal T2 and then by the transition from the pulse pause to the pulse. The latter occurs with a spacing of approximately half a period duration from the data pulse edge which triggers the process. The starting value is loaded in order that, in the case of resynchronization which could again lead to double samplings, the count of "9" can be reached more rapidly to permit a resynchronization process.

FIG. 6 represents another receiving-end arrangement for the implementation of the method corresponding to the invention. In comparison to the arrangement shown in FIG. 4b, this arrangement additionally has a change-over switch 50, a resistor 51, a switch 52 and a capacitor 54.

These additional components provide an error correcting facility for a digital signal DS3 which has a bit rate of 4.8 kbit/s and less. The error correction serves to prevent a bit BF, which has been degraded in the transmission of the 64 kbit/s data flow in the time division multiplexed signal and which occurs at random at the sampling time, from degrading an entire bit of the digital signal DS3 with the low bit rate. For this purpose the capacitor 54 is charged and discharged by the digital signal DS3. Since this capacitor 54 is an integrating component, its charge at the sampling time is always determined by a plurality of pulses of the digital signal DS3.

For the error correction the permitted sampling range, that is the window, is reduced in size. For this purpose the change-over switch 50 supplies the exclusive-NOR-gate 21 with a digital signal at the output 49 of the shift register 17, which has a delay greater than that of the digital signal at the output 20.

Figure 7:
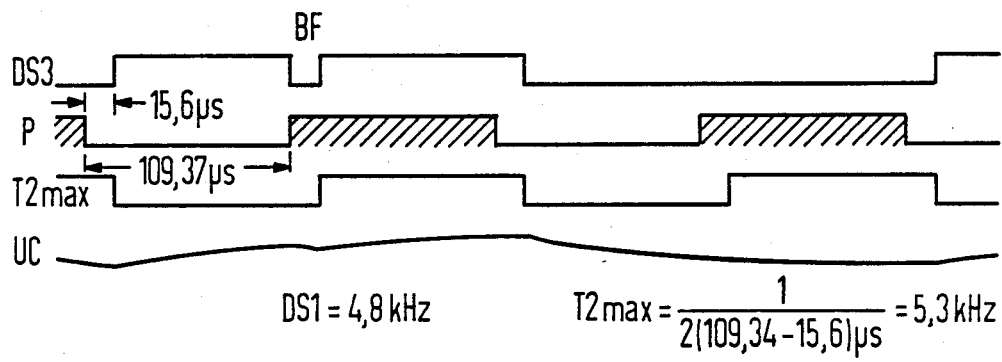
FIG. 7 is a diagram illustrating a pulse plan relating to an error correction device in the arrangement shown in FIG. 6.

FIG. 7 represents the digital signal DS3, the changed pulse P, the clock signal T2 with the maximum permissable frequency of 5.3 kHz and the capacitor voltage UC at the measuring point 53.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method of transmitting a first digital signal in a time section of a pulse frame of a time division multiplexed signal for which a higher bit rate than that of the first digital signal is made available for transmission in this time section, comprising the steps of:
   at a transmitting end over-sampling the first digital signal with a first clock signal assigned to this time section,
   transmitting a second digital signal, obtained as a result of the over-sampling, in the time deviation multiplexed signal and,
   sampling at a receiving end, following demultiplexing, the second digital signal with a second clock signal, corresponding to its bit rate, omitting forbidden phase position zones which would otherwise lead to double samplings.

2. A method of transmitting a first digital signal in a time section of a pulse frame of a time division multiplexed signal for which a higher bit rate than that of the first digital signal is made available for transmission in this time section, comprising the steps of:
   at a transmitting end over-sampling the first digital signal with a first clock signal assigned to this time section,
   transmitting a second digital signal, obtained as a result of the over-sampling, in the time division multiplexed signal and,
   sampling at a receiving end, following demultiplexing, the second digital signal with a second clock signal, corresponding to its bit rate, omitting forbidden phase position zones which would otherwise lead to double samplings, and for the formation of a pulse train which blocks the forbidden phase position zones in that these are overlapped by pulses, delaying the second digital signal by one period of the first clock signal and further-processing it as a third digital signal, delaying the second digital signal by two periods of the first clock signal thereby providing a fourth digital signal, and inputting the second digital signal and the fourth digital signal to an exclusive-OR logic-link.

3. A method of transmitting a first digital signal in a time section of a pulse frame of a time division multiplexed signal for which a higher bit rate than that of the first digital signal is made available for transmission in this time section, comprising the steps of:
   at a transmitting end over-sampling the first digital signal with a first clock signal assigned to this time section,
   transmitting a second digital signal, obtained as a result of the over-sampling, in the time division multiplexed signal and,
   sampling at a receiving end, following demultiplexing, the second digital signal with a second clock signal, corresponding to its bit rate, omitting forbidden phase position zones which would otherwise lead to double samplings, and the second clock signal being derived from a third clock signal of the time division multiplexed signal.

4. The method as claimed in claim 1, wherein a bit rate of between 0.6 and 19.2 kbit/s is selected for the first digital signal and a frequency of 64 kHz is selected for the first clock signal.

5. The method as claimed in claim 3, wherein the second clock signal is derived from a 2048-kHz-clock signal of the time division multiplexed signal by multiplication by $\frac{3}{4}$, to produce a frequency of 1536 kHz and subsequent division by $2^n$ where n=7,8,9,10 and 11 to produce frequencies of 0.75 kHz, 1.5 kHz, 3 kHz, 6 kHz and 12 kHz, respectively.

6. The method as claimed in claim 3, wherein the second clock signal is derived from a 2048-kHz clock signal of the time division multiplexed signal by multiplication by $\frac{3}{4}$ to produce a frequency of 1536 kHz, followed by division by five, to produce a frequency of 307.2 kHz, and followed by a final division by $2^n$ where n=4,5,6,7,8 and 9 to produce frequencies of 0.6 kHz, 1.2 kHz, 2.4 kHz, 4.8 kHz, 9.6 kHz, and 19.2 kHz, respectively.

7. The method as claimed in claim 1, wherein in the step of sampling at a receiving end when a determinate number of sampling times occur in forbidden phase position zones, a resynchronization is carried out.

8. A transmitting-end arrangement for transmitting a first digital signal in a time section of a pulse frame of a time division multiplexed signal for which a higher bit rate than that of the first digital signal is made available for transmission in this time section, comprising a first shift register, provided for series-parallel conversion of the first digital signal with a first clock signal and a second shift register, connected to the first shift register provided for parallel-series conversion to produce a second digital signal with a second clock signal of the time division multiplexed signal when a channel of the time division multiplexed signal is released, the second digital signal being obtained as a result of over-sampling the first digital signal with the first clock signal.

9. A receiving-end arrangement for transmitting a first digital signal in a time section of a pulse frame of a time division multiplexed signal for which a higher bit rate than that of the first digital signal is made available for transmission as a second digital signal in this time section, comprising a first shift register provided for series-parallel conversion of the second digital signal with a first clock signal, a second shift register, connected to said first shift register, provided for parallel-series conversion of the second digital signal with a second clock signal when the channel of the time division multiplexed signal is released,
   a third shift register provided for a delay of the second digital signal, received from the second shift register, with the second clock signal, the third shift register having a first output for the second digital signal, a second output for a third digital signal and a third output for a fourth digital signal,
   an exclusive-NOR-gate having a first input connected to the first output of the third shift register and having a second input connected to the third output of the third shift register, an upwards/downwards counter having an input connected to the output of the exclusive-NOR-gate, a logic unit having a first input connected to the second output of the third shift register, having a second input connected to the output of the exclusive-NOR-gate, having a third input connected to a maximum/minimum output of the upwards/downwards counter, having a first output connected to a load-input of the upward/downwards counter, and having a second output connected to a clock-enable input of the upwards/downwards counter, a first D-flip-flop having a D-input connected to the second output of the third shift register, a second D-flip-flop having a D-input connected to a Q-output of the first D-flip-flop having a Q-output for outputting a fifth digital signal, and a central clock having first and second frequency dividers which are connected in parallel at their output, of which the first frequency divider is connected via an output to a clock input of the first D-flip-flop and via an erasing input to a third output of the logic unit, and of which the second frequency divider is connected via an output to a clock input of the second D-flip-flop and to a clock output.

10. The receiving-end arrangement as claimed in claim 9, wherein said logic unit comprises a first AND-gate having a first input connected to the second input of the logic unit, having a second input connected to the third input of the logic unit, and having an output connected to the clock-enable input of the upwards/downwards counter, an inverter having an input connected to the first input of the first AND-gate, a second AND-gate having a first input connected to the second input of the first AND-gate and having a second input connected to an output of the inverter, a third D-flip-flop having a D-input connected to an output of the second AND-gate and having a clock input receiving the first clock signal, a fourth D-flip-flop having a D-input connected to the second output of the third shift register and having a clock input receiving the first clock signal, an exclusive-OR-gate having a first input connected to the second output of the third shift register and having a second input connected to a Q-output of the fifth D-flip-flop, a third AND-gate having a first input connected to a Q-output of the fourth D-flip-flop and having a second input connected to an output of the exclusive-OR-gate, a sixth D-flip-flop having a D-input connected to an output of the third AND-gate and having a clock input receiving an inverted first clock signal and having a Q-output connected to an erasing input of the fourth D flip-flop and to the third output of the logic unit.

11. The receiving-end arrangement as claimed in claim 9, wherein an RC-component has a resistor connected between the second output of the third shift register and the D-input of the first D-flip-flop, and a capacitor connected between the D-input of the first D-flip-fop and ground, via a switch, and the second input of the exclusive-NOR-gate is connected via a change-over switch to the third output for a first switch setting an to a further output of the third shift register for a second switch setting.

* * * * *